United States Patent [19]

Baker

[11] 4,271,460
[45] Jun. 2, 1981

[54] SOFT TURN-ON POWER

[75] Inventor: Richard H. Baker, Bedford, Mass.

[73] Assignee: Exxon Research and Engineering Company, Florham Park, N.J.

[21] Appl. No.: 14,108

[22] Filed: Feb. 22, 1979

[51] Int. Cl.³ .............................................. H02H 7/10
[52] U.S. Cl. ..................................... 363/49; 363/50; 323/901; 323/908; 361/13
[58] Field of Search ................................ 363/49–50, 363/53, 56; 361/3, 9, 13, 58; 323/9, 96, 22 SC, 22 Z

[56] References Cited

U.S. PATENT DOCUMENTS

| | | | |
|---|---|---|---|
| 2,626,378 | 1/1953 | Levy, Jr. | 363/49 |
| 3,412,314 | 11/1968 | Crane | 323/22 SC |
| 3,769,568 | 10/1973 | Hamilton et al. | 363/49 X |
| 3,781,637 | 12/1973 | Potter | 363/27 |
| 3,787,756 | 1/1974 | Berger | 363/53 |
| 3,935,511 | 1/1976 | Boulanger et al. | 361/58 |
| 3,935,527 | 1/1976 | Michelet et al. | 361/58 X |
| 4,131,927 | 12/1978 | Tsuchiya et al. | 361/9 X |

*Primary Examiner*—J. D. Miller
*Assistant Examiner*—Peter S. Wong
*Attorney, Agent, or Firm*—Paul E. Purwin

[57] ABSTRACT

A circuit for suppressing surge or transient currents between a DC power supply and a capacitive load includes a suppression impedance of relatively high impedance connected in series with the load between the DC supply and load, a transistorized control circuit for sensing the voltage across the load, and producing a firing signal when the level of voltage exceeds a predetermined level, and an SCR having its main current path connected in parallel with the suppression impedance, and its gate electrode receptive of the firing signal for turning on the SCR to by-pass the suppression impedance subsequent to application of power to the load.

10 Claims, 2 Drawing Figures

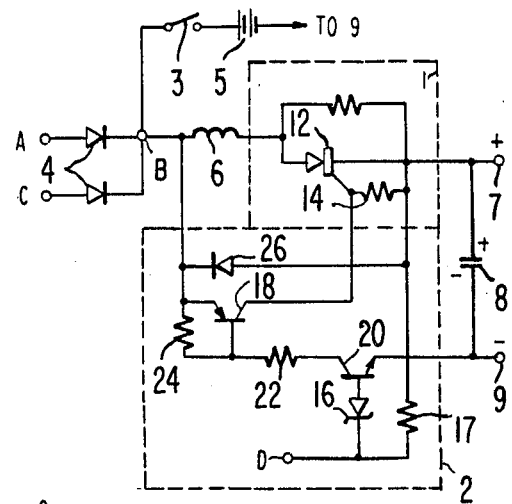
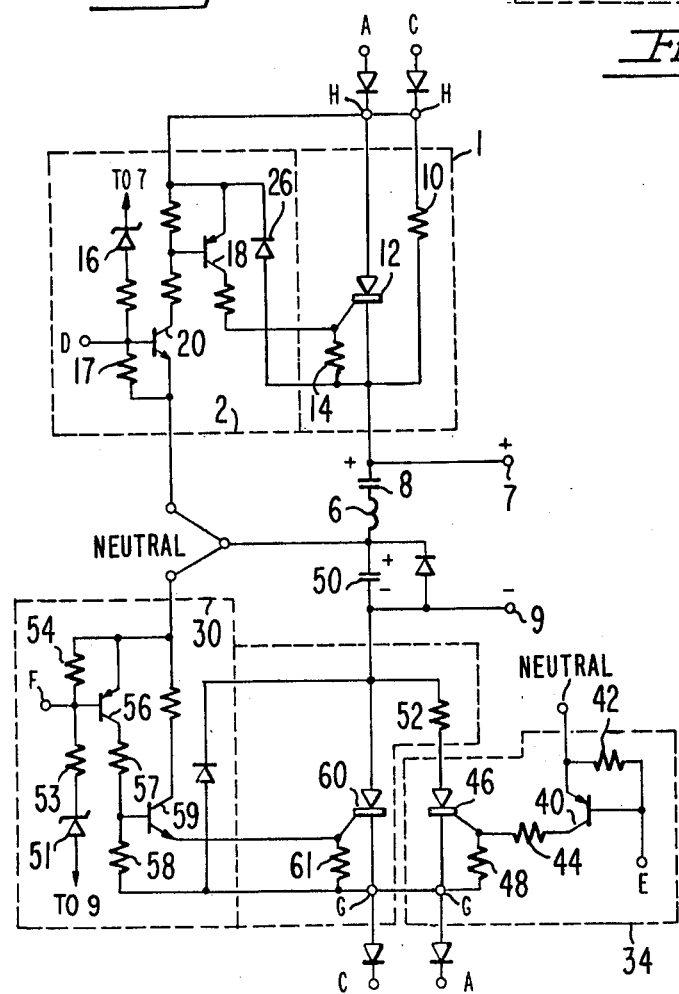
Fig.2
Fig.1

SOFT TURN-ON POWER

BACKGROUND OF THE INVENTION

The invention relates generally to current transient suppression circuitry and more particularly to such circuitry for controlling and limiting inrush current transients associated with turn-on of power supplying circuits.

Current transients in rectifier and similar such power supplying circuits, for example, are generally characteristic of the charging of uncharged capacitive components such as capacitive loads upon the initial application of a voltage to the circuit. This initial charging period of substantially uncharged circuit capacitance will hereinafter be referred to as circuit turn-on. These transients are particularly attributable to the charging of large value filter and storage capacitors which are typically connected between the output terminals of a rectifier to filter the rectified unregulated voltage. At turn-on of power supplying circuits, the voltage between the output terminals attempts to increase in a step-wise manner, however, the uncharged capacitors appear as the electrical equivalent of a short circuit, resulting in a large initial surge current.

In a rectifier circuit having a sinusoidally varying input voltage, this surge current will be a maximum when the circuit is switched on at a point in time when the input voltage is at or near its peak value. Though brief in duration, this initial current surge or inrush current may be orders of magnitude greater than the normal operating current. The problem is compounded when, in addition to the capacitance internal to the rectifier circuit itself, the circuitry to which power will be supplied is also capacitive and substantially uncharged, adding to the total circuit capacitance. This additional parallel capacitance adds to the value of internal capacitance, whereupon applying a turn-on voltage $V_i$, the surge current $I_i$ may be expressed as $I_i = Cdv/dt$ where C is the total circuit capacitance and dv is the instantaneous change in voltage over a minutely short period of time. Evidently, increasing C and having a relatively small dt increases $I_i$. Circuitry experiencing the surge current must be designed to accomodate the momentary higher current or alternatively, means must be provided to suppress this initial current transient.

Conventionally, relatively large values of series inductance (series with respect to the internal capacitance and circuit load) provide the requisite impedance to suppress turn-on current transients. An inductance appears as an open circuit to an instantaneous change in voltage, thereby presenting a large impedance to current transients caused by the initial application of input voltage to the circuit.

Conventionally, an L-C filter network serves both to filter unwanted A-C ripple, and to impede inrush current resulting from rapid voltage changes. However, the convention of using series inductance to suppress inrush current transients suffer several drawbacks, especially in relatively high power applications. To be of sufficient impedance to suppress inrush current in typical rectifier circuits, the inductor must be of a relatively large value. A large inductance in series with the full wave rectifier may extend each rectifier's conduction period such that conduction in one rectifier does not terminate until the other rectifier starts conducting, resulting in a reduced average output voltage and current. Additionally, a large value of inductance is conventionally obtained using an iron core inductor which is physically large, heavy and expensive relative to other component costs. Such an inductor will be shunted with a large amount of stray capacitance and the nonlinear properties of the iron core may cause undesirable signal distortion. Furthermore, the large time constant produced by using the large inductance in series with the large capacitance may not be desirable subsequent to turn-on. Therefore, it is advantageous to provide current transient suppression only for the duration of "turn-on" or initial current surge, and thereafter remove or disable the suppression circuit from the rest of the circuitry for circuit operation subsequent to turn-on (i.e., when all capacitive components are substantially charged).

PRIOR ART

Means for providing inrush current suppression which may be switched out of the operating circuit after a turn-on period are known in the art. Relevant art discloses both electro-mechanical and solid-state means for switching current suppressing impedances into and out of rectifier and similar such circuitry. For example, U.S. Pat. No. 2,626,378 demonstrates a means for utilizing an electromagnetic relay, energized by the circuits' output voltage, to switch additional inductance into and out of the circuit.

U.S. Pat. No. 3,781,637 discloses a solid-state means for switching inrush current impedance into and out of the circuit. This disclosure teaches the use of a silicon-controlled rectifier, hereinafter referred to as an SCR, coupled in parallel with a current limiting resistance. Initial charging of circuit capacitance is through this resistance. Upon receiving an externally generated control signal, a second SCR discharges the capacitors stored charge through primary windings of an output transformer which in turn charges a second capacitance. The charge of the second capacitance is higher in voltage than the first. This voltage causes the SCR to turn-on, by-passing the current limiting resistance. This disadvantage of such a circuit is that it functionally requires an external control signal. Additionally, the circuit teaches the use of both a second serially connected SCR and a transformer (inductance).

An alternative means of limiting inrush current is to control the input voltage. In U.S. Pat. No. 3,787,756 a control circuit initially displaces the firing (rendering conductive) of serially-connected SCR's to initially operate the rectifier circuit only at lower voltage levels. After initial capacitor charging at increasingly higher voltage levels, the SCR's are fired throughout the major portion of the input voltage cycle. Similar means of controlling input voltage is disclosed in U.S. Pat. No. 3,769,568 wherein output voltage responsive means controls the duty cycle of the input inverter circuitry.

SUMMARY OF THE INVENTION

The present invention provides a circuit for suppressing current transients in uncharged capacitive circuits referred to generally as "soft turn-on power." Solid-state switching circuitry, responsive to the voltage developed across circuit capacitance, electronically bypasses inrush current suppression impedance upon sensing a preset percentage of the fully charged condition. Upon charging circuit capacitance to a predetermined level, a voltage corresponding to the state of charge of circuit capacitance triggers said sensing circuit and, in turn fires, said switching circuit to provide a low impedance by-pass to the inrush current suppression impedance, effectively removing this impedance during the normal (non-transient) operation of the circuitry. The "soft turn-on" circuitry is shown embodied in a full wave DC rectifier and additionally in a dual DC voltage bridge rectifier. Although external override controls are provided, the inrush current suppression circuitry operates independent of external control signals.

DESCRIPTION OF THE DRAWINGS

In the drawings, where like elements have the same reference designation:

FIG. 1 is a circuit diagram for a full wave rectifier employing the soft start circuitry of the present invention.

FIG. 2 is a circuit diagram for a dual DC voltage bridge rectifier employing an alternate embodiment of the soft start circuitry of the present invention.

DETAILED DESCRIPTION OF THE INVENTION

By way of general outline, here follows first a description of the soft start circuitry embodied in a single voltage DC rectifier, then a modified soft start circuit is shown embodied in a dual DC voltage power supply.

In FIG. 1, an AC to DC rectifier includes conventionally arranged input rectifying diodes 4, filter network including inductance 6 and filter or storage capacitor 8, and soft start circuitry containing switchable input impedance circuit 1 and turn-on control circuit 2.

It is the basic concept of this invention that applying an initial voltage to the circuit and for a short period thereafter, which will hereinafter be referred to as circuit turn-on, additional input impedance is included in the circuit to suppress the initial inrush current to uncharged circuit capacitance. Subsequent to turn-on, that is, upon charging storage or filter capacitor 8, soft start turn-on control circuit 2 senses the charged condition of capacitor 8 and provides a signal to switchable impedance circuit 1 whereupon the inrush current suppression impedance is shunted by an impedance having a relatively low value. In this manner, circuit impedance is minimized during normal (non-transient) current conditions.

The soft start switchable impedance circuit 1 comprises input suppression impedance 10, solid-state switching means 12 (here shown as a silicon-controlled rectifier), and gate bias resistor 14. The turn-on control circuit includes control zener diode 16 and zener bias resistor 17, first and second control transistors 18 and 20, voltage divider resistors 22 and 24, and control protection diode 26.

Component interconnection of rectifier, control and impedance circuits, as schematically shown in FIG. 1, is as follows:

An AC input signal at terminals A and C is rectified by conventionally arranged input diodes 4 to provided unfiltered DC to terminal B. A filter inductance 6 of relatively low inductive reactance is serially connected between input terminal B and soft start switchable impedance circuit 1. The switchable impedance circuit 1, comprising the parallel circuit of SCR 12 and suppression impedance 10, is serially connected between the filter inductor 6 and one terminal (here illustrated as the positive terminal), of the filter or storage capacitor 8. As shown, the anode of SCR 12 is connected to the filter inductance 6 and additionally to one terminal of impedance 10. The cathode of the SCR is connected in common to one terminal (here illustrated as the positive terminal) of storage capacitor 8 and additionally to suppression impedance 10. The gate or control terminal of SCR 12 is connected to its cathode terminal through gate bias resistor 14. The gate is additionally connected to the collector terminal of first control transistor 18. As shown, the base of first transistor 18 is connected through resistor 24 to its emitter terminal, the latter being further connected to input terminal B. A second control transistor 20 has its collector connected to the base of 18 through resistor 22 and emitter connected in common to the other end (− terminal) of capacitor 8, and to the negative output terminal 9. The base of transistor 20 is connected to the anode of control zener diode 16. The cathode of zener 16 is connected to one terminal (here shown as the positive terminal) of capacitor 8 through resistor 17. A protection diode 26 has its anode connected to the positive terminal of the storage capacitor 8, and its cathode connected to the emitter of first control transistor 18.

Operation of the Circuit

Still referring to FIG. 1, in a quiescent state capacitor 8 is substantially uncharged and SCR 12 is in a nonconductive (turned-off) state. Similarly, soft start control circuit 2, in the quiescent state, has first and second transistors 18 and 20 and zener control diode 16 in a non-conductive (turned-off) state. Upon applying an initial AC voltage to the circuit, an unfiltered positive DC voltage is applied to circuit input here illustrated as terminal B. With SCR 12 turned off, charging of filter or storage capacitor 8 is accomplished through serially connected impedances of inductor 6 and suppression impedance 10. Therefore, the current experienced during the initial charging of the uncharged capacitor 8 is limited by the series impedance of both the inductor 6 and the suppression impedance 10.

Subsequent to turn-on, that is, upon charging circuit capacitance, and in particular, filter capacitor 8, to a predetermined voltage level, a corresponding voltage is developed across control zener diode 16 which diode is connected across capacitor 8 via resistor 17 and the base-emitter current path of transistor 20 applies an appropriate reverse bias to break down (render conductive) the diode. This in turn supplies a sufficient current to the base of N-P-N transistor 20 to be turned-on (rendered conductive)

In a conductive state, a sufficient current flows through transistor 20 and voltage divider resistors 24 and 22, to pass sufficient current to the base of P-N-P transistor 18 to turn-on (render conductive) this transistor. In a conductive state, a sufficient current flows through first control transistor 18 into the gate electrode to SCR 12 for firing (rendering conductive) the SCR. In the conductive state, the main current path of the SCR provides a low impedance path across impedance 10, substantially by-passing suppression impedances 10 in the normally operating (non-transient conditions) circuit. In the non-conductive state of SCR 12, its main conduction path has a relatively high impedance, substantially greater than that of suppression impedance 10.

In an operating (non-transient) condition, the soft turn-on power circuit of FIG. 1 having SCR 12 in a conductive state, electrically by-passes or shunts insurge current suppression impedance 10. As previously mentioned, sufficient filtering is accomplished by a relatively small value of inductance 6 in conjunction with filter capacitance 8. In accordance with the teaching of the invention, the inductance 6 alone need not provide inrush current suppression; for in providing an effectively removable inrush current suppression impedance 10, said impedance 6 may be reduced by an amount expressed as $$\frac{l}{L} = 1 - \frac{V_{ZD}}{V_{rms}\sqrt{2}}$$

where l/L is the ratio of reduction and $V_{ZD}$ is the zener diode voltage.

In other words, when SCR 12 is fired, capacitor 8 is substantially charged, so that when impedance 10 is by-passed by SCR 12, the relatively low value of current for completing the charging of capacitor 8 is adequately regulated by inductor 6, even though 6 has a low value of inductance.

Typically, an SCR may be turned off by reducing its current below its holding value or by reducing the anode to cathode voltage to zero. Turn-off time is here further minimized by resistor 17 connected between the gate and cathode of SCR 12.

Although not shown, terminal D may be provided with an external turn-off control for maintaining control circuit 2 in the quiescent or turned-off state. When terminal D is at an equivalent of ground potential, control zener diode 16 and associated control transistors 18 and 20 are maintained in a turned-off (non-conducting) condition. Resistor 17 is of sufficiently high resistance to ensure a relatively minimal current flow through the turn-off control.

Protection diode 26, though not of operational necessity to the control circuit, prevents reverse current flow through control transistors, which may occur upon loss of input voltage to the circuit.

Referring now to FIG. 2, there is shown the general soft turn-on power of FIG. 1 embodied in a dual DC voltage level power supply. As a general outline, the upper portion of the circuitry is identifiable as substantially identical to the circuit of FIG. 1, the distinction, evident in the drawing, being the repositioning of inductance 6 to be utilized by both portions of the circuit. The lower portion of the circuitry, collectively identified as the negative section, is functionally equivalent; however, it is designed to operate on an intermittant basis, i.e., only upon the need for providing the second DC voltage level. Therefore, in this embodiment, a turn-on control circuit 34 provides the ability to switch on and off the negative soft turn-on power circuitry. The circuitry remains passive when not supplying the second DC voltage level, eliminating unnecessary power dissipation.

Referring again to FIG. 2, the negative portion of the soft turn-on power circuit includes negative soft turn-on control circuit 30, switchable input impedance circuit 32, turn-on control circuit 34, filter capacitor 50 and filter inductor 6. Turn-on control circuit 34 includes a conventionally arranged signal isolating amplifier comprising transistor 40 and bias resistors 42 and 44 which provides a firing signal to the gate electrode of turn-on control circuit SCR 46. As alluded to previously, it is the function of turn-on control circuit 34 to electrically engage the negative portion of the soft turn-on power circuitry. Therefore, upon applying an on control signal to terminal E, transistor 40 is rendered conductive, allowing current to flow into the gate of SCR 46, firing or turning on the SCR.

At this juncture, the negative portion of the soft turn-on power circuit is functionally similar to the single voltage level circuit of FIG. 1 at circuit turn-on. That is, storage capacitance 50 is uncharged and appears the equivalent of a short circuit to an instantaneous change in voltage. Accordingly, when SCR 46 is rendered conductive, storage capacitor 50 is charged through impedance 52, which impedance limits the inrush current to the uncharged capacitance. Upon capacitor 50 to a predetermined voltage level, which in this embodiment is negative with respect to ground or neutral, the reverse bias voltage which is correspondingly developed across zener diode 51, diode 51 being connected across capacitor 50 vias resistor 53 and the base emitter current path of transistor 56, breaks down the zener diode. Current passes through resistor divider network 53, 54 developing an appropriate bias voltage between the emitter and base of P-N-P transistor 56 causing current flow from the base in turn causing the transistor to turn-on. This in turn passes current through the main current path of transistor 56, into resistor 57 and 58 and to the base of N-P-N transistor 59 via resistor 57 causing this transistor to turn-on. Current now flows through the collector emitter path of transistor 59 into the gate electrode of SCR 60, firing or turning on this SCR. Accordingly, when conductive, SCR 60 provides a low impedance by-pass of inrush current suppression impedance 52. Thereby, in a manner similar to that described for FIG. 1, initial inrush current for this negative voltage section is suppressed or limited until circuit capacitance is charged to a predetermined level, at which time the impedance used to suppress the inrush current is automatically by-passed.

As noted earlier, the second DC voltage level is to be supplied only on an intermittant basis. Therefore, means is provided to turn off the negative soft turn-on power section of the circuit. A negative off control signal is provided by grounding terminal F and removing the on control signal from terminal E. Upon removing the on control signal from E, SCR 46 turns off. Though evident to one skilled in the art, resistor 48 minimizes the turn-off time of SCR 46. Grounding terminal F turns off transistors 57 and 59, which removes the gate or control current from SCR 60. As described for SCR 46, resistor 61 similarly minimizes the turn-off time of SCR 60. With both SCR 60 and SCR 46 in the non-conductive state, the entire negative portion of the soft turn-on power circuit is inactive, realizing no power dissipation in any of the components.

Should it become preferred to operate the power supply to constantly provide both DC voltage levels, one may hand wire an electrical by-pass of 34 and in particular SCR 46. The negative soft turn-on power section of the circuit would be functionally equivalent to the positive section.

Although the invention has been illustrated in preferred applications of rectifier and similar power supply circuits, the soft turn-on circuitry of the present invention is of evident utility in any current transient suppression circuit which advantageously by-passes the transient suppression means upon reaching operating (non-transient) conditions. For example, in FIG. 1, the diodes 4 can be replaced by a switch 3, and battery 5. When switch 3 is closed, assuming capacitor 8 is substantially uncharged, the circuit will operate as previously described to limit surge or transient currents.

What is claimed is:

1. A dual DC voltage power supply providing positive and negative DC voltages including soft turn-on circuitry to limit inrush current to substantially uncharged capacitive loads, said power supply comprising:
   a plurality of rectifier circuits providing at least one positive DC voltage level and at least one negative DC voltage level from at least one AC input voltage;
   a plurality of power terminals for receiving said rectified voltage;
   an output terminal for each said DC voltage level;
   a reference terminal for connection to a point of reference potential;
   control means for each said DC voltage level, said control means being coupled in parallel relation with said capacitive load and responsive to the voltage developed across said load attaining a predetermined value whereupon said control means provides a firing signal;
   turn-on current suppression means for each DC voltage level, said suppression means having a relatively high impedance connected between one of said power terminals and said output terminal, wherein said impedance limits the magnitude of current supplied to said load in the absence of said control firing signal; and
   switching means having a main current conduction path coupled in parallel with each said suppression impedance, said switching means being responsive to said control firing signal to provide a low impedance by-pass across said suppression impedance.

2. The circuit set forth in claim 1 wherein said control means comprises:
   a voltage breakdown device coupled in parallel with said capacitive component developing a voltage across said device corresponding to the level of voltage across said capacitive load whereupon said voltage attaining said predetermined level said voltage breakdown device is rendered conductive; and
   first and second control transistors whereupon rendering conductive said voltage breakdown device a sufficient current is applied to the base electrode of said first transistor to render it conductive which in turn permits sufficient current to pass into the base of said second transistor to render it conductive, said second transistor in a conductive state providing a firing signal to said switching means.

3. The circuit set forth in claim 2 wherein said voltage breakdown device comprises a zener diode.

4. The circuit set forth in claim 2 wherein said first control transistor is an NPN transistor and said second control transistor is a PNP transistor.

5. The circuit set forth in claim 1 wherein said switching means comprises an unidirectional thyristor having its gate electrode connected to receive said firing signal from said control means and having its anode and cathode coupled across said input suppression impedance.

6. The circuit set forth in claim 5 wherein said unidirectional thyristor comprises a silicon controlled rectifier.

7. The circuit set forth in claim 1 wherein said suppression impedance comprises a relatively high value resistor whereupon said switching means being in a non-conducting state said resistor constitutes the main current path in said parallel circuit.

8. The circuit set forth in claim 1 further comprising a turn-off control means includes a zener diode coupled in parallel with said capacitive load and said turn-off control means comprises an externally accessible cathode terminal of said zener diode whereupon grounding said cathode terminal prohibits said diode from being rendered conductive.

9. A dual DC voltage power supply providing positive and negative DC voltage on a controllably intermittant basis including soft turn-on circuitry to limit inrush current to substantially uncharged capacitive loads said power supply comprising:
   a plurality of rectifier circuits providing at least one positive DC voltage level and at least one negative DC voltage level from at least one AC input voltage;
   a plurality of power terminals for receiving said rectified voltage;
   an output terminal for each said DC voltage level;
   a reference terminal for connection to a point of reference potential;
   turn-on current suppression means for each DC voltage level, said suppression means having a relatively high impedance connected between said power terminal and said output terminal, wherein said impedance limits the magnitude of current supplied to said load in the absence of said control firing signal;
   intermittant voltage turn-on switching means responsive to an externally supplied turn-on control signal coupled in series with said suppression impedance and between said power terminal and said load whereupon sensing said external signal said switching means has a main current conduction path between said load and said one of said power terminals permitting said load to charge to voltage supplied at said power terminal;
   control means for each said DC voltage level, said control means being coupled in parallel relation with said capacitive load and responsive to the voltage developed across said load attaining a predetermined value whereupon said control means provides a firing signal;
   switching means having a main current conduction path coupled in parallel with each said suppression impedance, said switching means being responsive to said control firing signal to provide a low impedance by-pass across said suppression impedance.

10. The power supply set forth in claim 9 wherein said intermittant voltage turn-on switching means comprises:
    a silicon-controlled rectifier (SCR) having its anode and cathode coupled in series relationship with said power terminal and said current suppression means, and a signal isolation amplifier for receiving said external signal whereupon said amplifier applies sufficient current to a gate electrode of said silicon-controlled rectifier (SCR) to render it conductive.

* * * * *